UNITED STATES PATENT OFFICE.

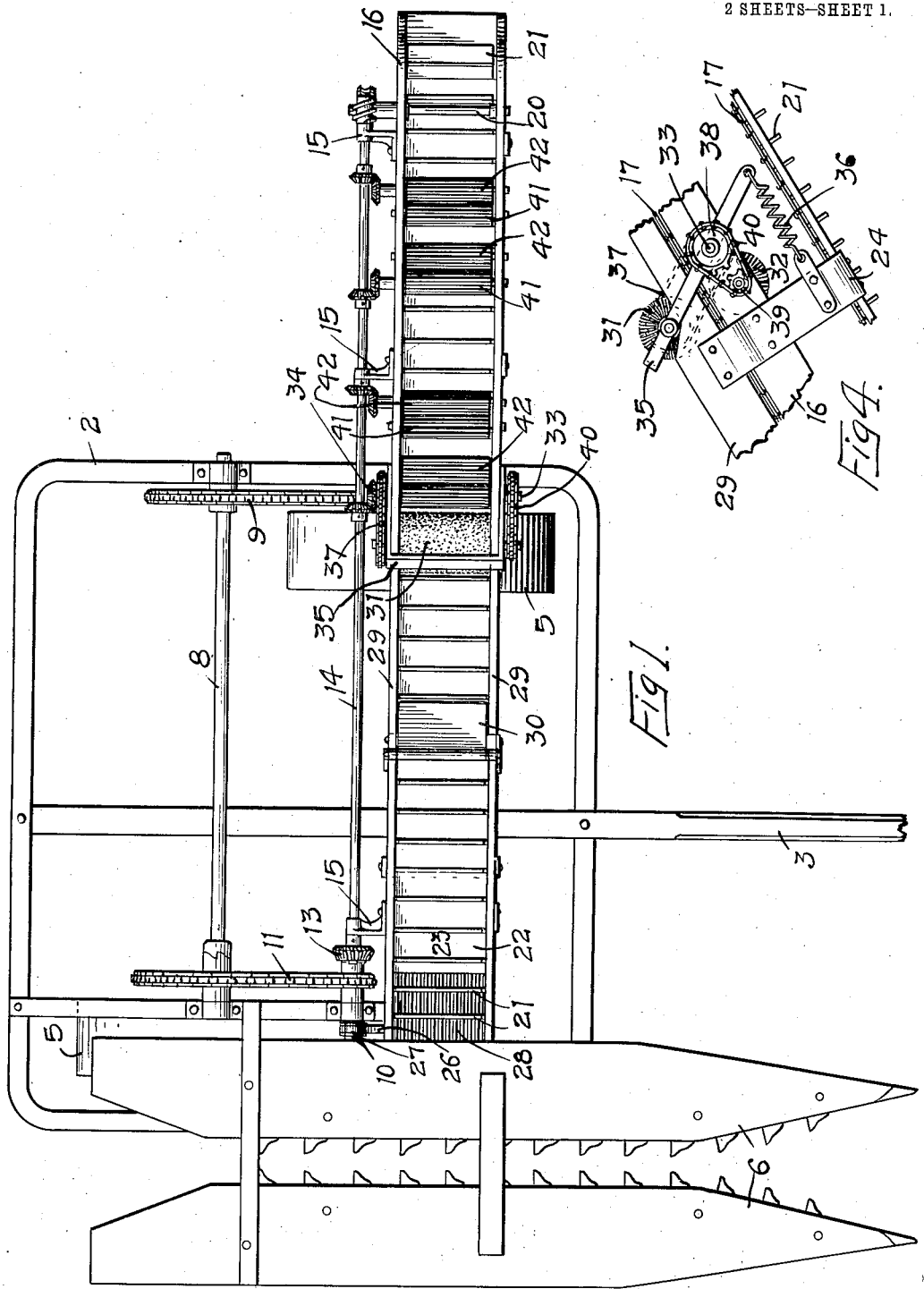

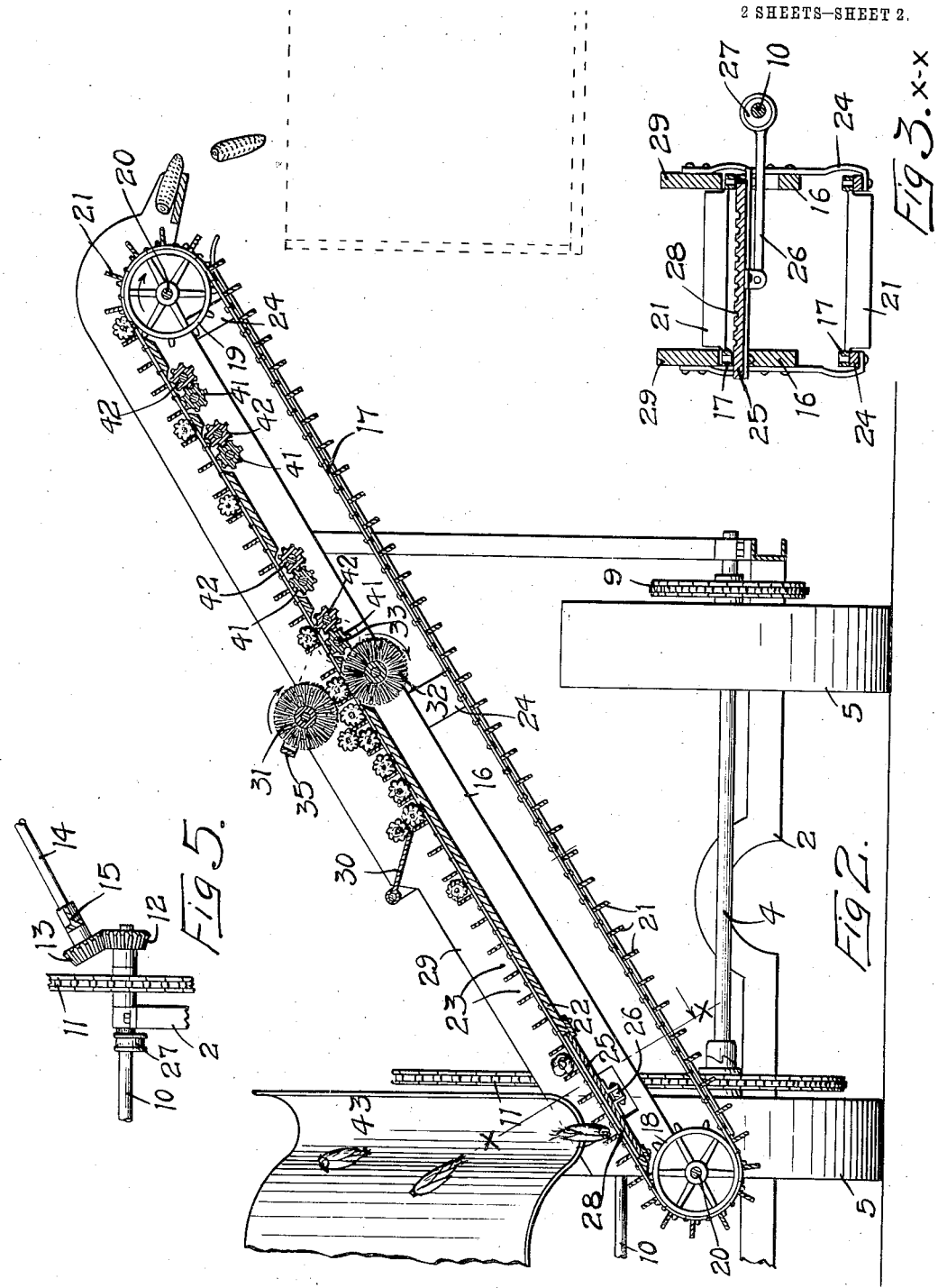

ALBERT ASPER, OF DOGDEN, NORTH DAKOTA, ASSIGNOR TO ADOLPH P. GUBRUD, OF HUDSON, SOUTH DAKOTA.

CORN-HUSKING MACHINE.

1,056,728.      Specification of Letters Patent.    Patented Mar. 18, 1913.

Application filed May 17, 1910, Serial No. 561,858. Renewed November 16, 1912. Serial No. 731,898.

*To all whom it may concern:*

Be it known that I, ALBERT ASPER, of Dogden, McLean county, North Dakota, have invented certain new and useful Improvements in Corn-Husking Machines, of which the following is a specification.

The object of my invention is to provide an apparatus adapted to receive ears of corn from the corn gatherer or from any other suitable source and thoroughly remove the husks and silk therefrom.

The apparatus is designed for use in connection with the machine shown and described in my pending application for Letters Patent of the United States, Serial No. 507,131, filed July 12, 1909, but is capable of performing its functions with any other suitable gathering apparatus or independently thereof, as preferred.

The invention consists generally in various constructions and combinations, all as hereinafter described and particularly pointed out in the claims.

In the accompanying drawings forming part of this specification, Figure 1 is a plan view illustrating my husking apparatus, Fig. 2 is a vertical sectional view of the same, Fig. 3 is a sectional view on the line $x$—$x$ of Fig. 2, Fig. 4 is a detail view showing the means for operating the husking brushes at different speeds, Fig. 5 is a detail view showing the connection between the drive shaft and the shaft which extends parallel with the elevator.

In the drawing, 2 represents a frame having a draft pole 3, an axle 4 and carrying wheels 5.

6 is the corn gathering apparatus which forms the subject matter of my pending application above referred to.

8 is a shaft driven by a belt 9 from one of the carrying wheels and 10 is a shaft driven through a belt 11 from the shaft 8 and having a gear 12 meshing with a similar gear 13 on a shaft 14 that is journaled in brackets 15 on the elevator frame 16. Belts 17 are adapted to pass around wheels 18 and 19, mounted on shafts 20 at the top and bottom of said elevator frame. Transverse blades 21 are interposed between the belts 17 and the upper run or limbs of said belts are adapted to slide on a floor 22 forming therewith a series of pockets 23 adapted to receive the ears of corn. These pockets are of sufficient width to accommodate a single ear in each of them but too narrow to receive more than one ear at a time. The lower run of the belts is supported on suitable hangers 24. (See Fig. 3.)

Near the lower end of the elevator I prefer to provide a plate 25 flush with the floor 22 and having a transverse reciprocating movement by means of a pitman connection 26 with an eccentric 27 on the shaft 10. The plate preferably has grooves 28 in its upper surface and its lateral reciprocation with respect to the elevator has the effect of causing the ears to assume a horizontal transverse position in the pockets of the elevator. Suitable side boards 29 are provided on each side of the elevator pockets to limit the endwise movement of the ears therein. A swinging gate 30 is arranged over the elevator near the middle portion thereof which allows the ears to ascend but prevents any of them which may be outside of their pockets from rolling back to the bottom of the elevator.

The husking mechanism which I prefer to employ in connection with this machine consists of brushes 31 and 32. A driving shaft 33 is mounted in the frame of the elevator and is geared to the shaft 14 at 34. A yoke 35 is journaled on the shaft 33 and overhangs the elevator and has bearings for the upper brush 31, said yoke being capable of oscillation in its bearings to raise or lower said brush. A spring 36 is connected with the lower end of said yoke and its tension tends to raise the upper brush, said spring being normally put under tension by the weight of said brush, which is thereby allowed to yieldingly rest on the tops of the ears in the pockets. The upper roll is driven by a belt 37 from the shaft 33 on one side of the elevator frame, and a sprocket 38 is provided on the outside end of said shaft and is connected with a smaller sprocket 39 on the shaft of the lower brush by means of a sprocket chain 40. With this connection the brushes will be operated at different speeds, the upper one bearing on the tops of the ears and the lower one on the undersides thereof through the opening in the floor 22, between the side walls of the pockets. The ears will thus be rolled in the pockets and the husks and silk stripped therefrom quickly and thoroughly and as fast as the pockets are fed between the upper and lower brushes. The working surfaces of the brushes will revolve in opposite directions and both will be positively driven, the upper one being capable of rising and falling or moving toward or from the ears of corn to accommodate itself to variation in the size of the ears. Corrugated rollers 41 and 42 are arranged in pairs under the upper run of the elevator belts in position to engage with the ears after they pass between the brushes and pull off any husk or silk which may be adhering thereto. These corrugated rollers are positively driven from the shaft 14, as indicated in Fig. 1.

In the operation of the machine, the ears of corn will be delivered to the lower portion of the elevator by a suitable means, such as the inclined plate 43, and falling upon the blades will gradually work around until they drop into the pockets, being aided by the reciprocating movement of the plate 25. Each ear will substantially fill its pocket and if several ears should become piled upon one another they will, after passing the gate 30, be prevented from rolling back to the foot of the elevator but will be held by said gate until empty pockets move into position to receive them. By the time the ears reach the husking brushes they will have assumed their proper position in the pockets and the revolution of the brushes will have the effect of loosening and separating the husks and silk so that when the ears emerge from between the brushes practically all of the covering of the ears will be removed, any silk or husks clinging thereto being pulled off by the corrugated rollers. In this way the ears of corn are rapidly and thoroughly husked.

I do not wish in this application to be confined to the number of brushes and corrugated rollers employed in connection with the elevating carrier, as the number may be increased according to the condition of the corn and as the removal of the husks and silk may make necessary.

I claim as my invention:—

1. A corn husking apparatus comprising an elevator having a series of transverse pockets adapted to receive ears of corn, a floor provided beneath the upper limb or section of said elevator, a transversely reciprocating plate provided in said floor, and a husking means.

2. A husking machine comprising a conveyer, a floor therein over which said conveyer operates, said conveyer having a series of transverse pockets adapted to receive the ears of corn, a transversely reciprocating plate arranged in said floor and having a series of longitudinal grooves therein, an operating shaft, a pitman rod connecting said shaft with said plate and a husking means.

3. The combination, with a floor having an opening therein, of an endless belt operating thereon and having transverse pockets adapted to receive the ears of corn, husking brushes arranged above and below said floor and the upper run of said belt and opposing one another through an opening in said floor, said brushes engaging the ears of corn fed between them by said belt and means for operating one brush at a greater speed than the other brush.

4. The combination, with an elevator and its conveyer having a series of transverse pockets adapted each to receive a single ear of corn, of means for removing the husks and silk from the ears, and a swinging apron arranged to prevent the ears from rolling downward over said pockets, substantially as described.

5. In a machine of the class described, the combination, with an elevator and its conveyer having a series of transverse pockets therein, each adapted to receive a single ear of corn, of upper and lower brushes between which the ears are moved in said pockets, and means arranged to prevent the ears from rolling down to the foot of the elevator over said pockets, substantially as described.

6. In a husking machine, a floor, a conveyer comprising side belts and blades supported thereon and moving edgewise above said floor, said blades forming the side walls of said pockets and said floor forming the bottoms thereof, said pockets being adapted each to receive a single ear of corn, husk removing brushes between which the ears are carried in said pockets, one of said brushes having an oscillating movement in the direction of movement of said conveyer, and means for oscillating said brush.

7. A husking apparatus comprising a floor, a conveyer operating thereon and having a series of transverse pockets, said floor forming the bottoms of said pockets, brushes between which the ears are carried in said pockets, one brush being arranged above said floor and the other beneath said floor and operating through an opening therein, the ears being fed in said pockets between said brushes, for the purpose specified.

8. In a husking machine, a conveyer having a series of pockets adapted to receive the ears of corn, upper and lower brushes and means for driving the same, and a pivoted yoke whereon said upper brush is mounted and adapted to rest upon the surfaces of the ears, substantially as described.

9. The combination, with a conveyer, of a series of pockets adapted to receive the ears of corn, upper and lower brushes between which the ears are moved by said conveyer, a pivoted yoke whereon one of said brushes is mounted, and means for yieldingly holding said yoke and brush in the path of the ears, substantially as described.

10. In a husking machine, the combination, with a floor, of a conveyer operating thereover and having a series of transverse pockets adapted to receive ears of corn, husking brushes arranged one above the upper run of said conveyer and the other below the upper run of said conveyer, said lower brush operating through an opening in said floor, and a series of silk removing rollers arranged in pairs beneath the upper run of said conveyer and operating through said floor on the discharge side of said brushes.

11. In a husking machine, a floor, a conveyer comprising side belts, transverse blades supported by said belts, said blades being spaced apart and forming with said floor a series of transverse pockets adapted to receive the ears of corn, the corn rolling on said floor in said pockets, brushes between which said conveyer passes, means for revolving said brushes and means for holding one of said brushes toward the ears of corn with a yielding pressure.

12. In a husking machine, the combination, with a floor, of a conveyer operating thereover and having a series of transverse pockets adapted to receive ears of corn, husking brushes arranged one above the upper run of said conveyer and the other below the upper run of said conveyer, and silk removing rollers provided on the discharge side of said brushes.

In witness whereof, I have hereunto set my hand this 6th day of May, 1910.

ALBERT ASPER.

Witnesses:
  A. L. LOMBARD,
  A. S. BOE.